March 8, 1932.  F. B. ANDERSON  1,848,236
SAUSAGE STUFFING MACHINE
Filed Nov. 14, 1930
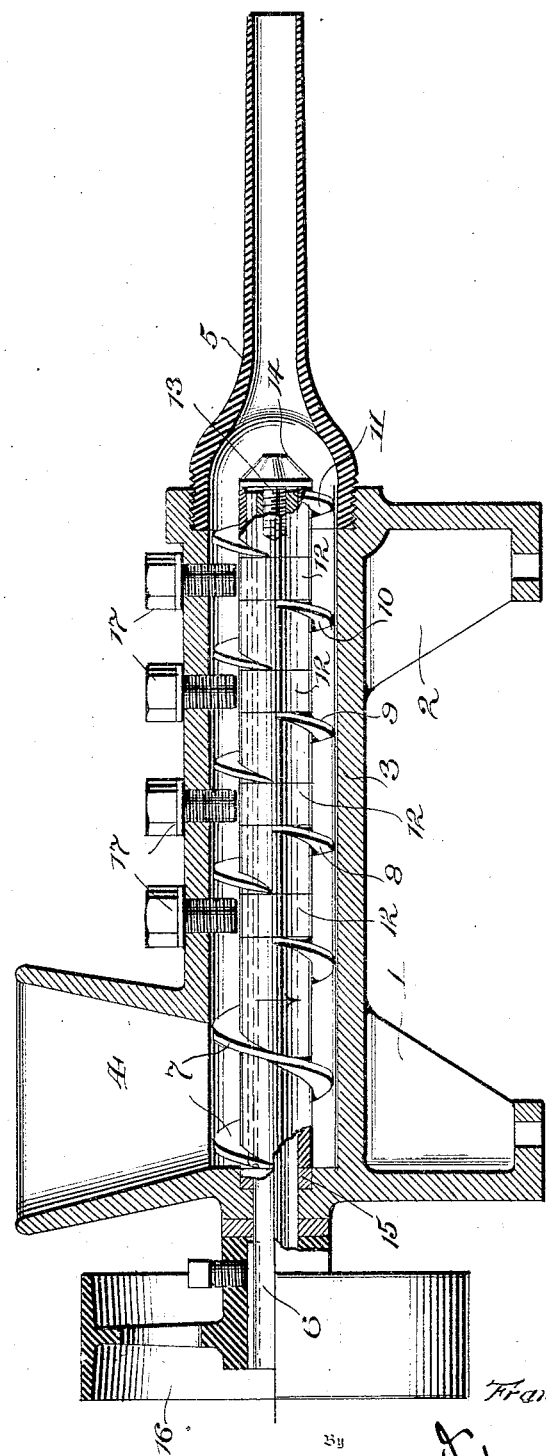
Inventor
Frank B. Anderson
By
Dodge and Sons
Attorneys.

Patented Mar. 8, 1932

1,848,236

UNITED STATES PATENT OFFICE

FRANK B. ANDERSON, OF CLEVELAND, OHIO, ASSIGNOR TO THE V. D. ANDERSON COMPANY, OF CLEVELAND, OHIO, A CORPORATION OF OHIO

SAUSAGE STUFFING MACHINE

Application filed November 14, 1930. Serial No. 495,743.

This invention pertains to sausage stuffing machines and has for its object the provision of a structure wherein the material is fed from a hopper to a discharge spout by means which act not only to compress and feed the material forward but which likewise have the effect of kneading the material so that the air is worked out therefrom.

The machine is shown in the annexed drawing wherein a longitudinal sectional elevation of the structure is shown.

The body of the machine is formed from a single casting to produce legs or standards 1 and 2 surmounting which is a barrel 3 imperforate throughout its length and opening at one end into a feed hopper 4. The opposite end of the barrel is internally threaded to receive a nozzle 5, the intake end of which has an internal diameter the same as that of the barrel and is then tapered to an outwardly extending reduced portion designed to receive upon its exterior the gut or casing into which the sausage is formed.

Extending into the barrel from the end adjacent the feed hopper is a shaft 6 which extends through the barrel and terminates within the enlarged portion of the nozzle 5. The shaft is provided with a longitudinal keyway for the securement thereon of a feed spiral 7, and a series of worms, as 8, 9, 10 and 11, separated from each other by spacing collars 12.

The shaft 6 at its inner end is provided with a longitudinally extending threaded opening into which is screwed the threaded portion 13 of a screw, the head 14 whereof takes against the body portion of the adjacent worm 11 and tends to hold the worms and collars against longitudinal movement on the shaft.

The feed flight 7 at its end adjacent the barrel takes against a collar or washer 15 seated in a recess formed in the adjacent wall of the barrel or shell. Thus by reason of the feed flight or spiral 7 and the worms and collars being keyed to the shaft and held against longitudinal movement they must of necessity rotate with the shaft and maintain their position thereon.

Rotary motion may be imparted to the shaft through any suitable means and in the instant case there is shown a driving pulley 16 secured upon the outer end of the shaft to which motion is imparted from any suitable source.

Extending inwardly of the barrel in line with the spacing collars 12, and preferably with each of them, is a cap screw or knife 17, the inner end whereof lies close to the collar and arrests the rotation of the material as it is fed forwardly by the feed flight and worms. These members so agitate and knead the material that the air is worked out of the charge as it passes forwardly to the nozzle 5.

The separated worms 8, 9 and 10 in operation gather the material and force the same forwardly toward the next adjacent worm whereby the material is subjected to increasing pressure toward the discharge end of the machine and the screws, or their equivalent, arresting the rotation of the material, as above set forth, as it passes from one screw to the other.

The material passing from the final worm 11 is discharged into the enlarged portion of the nozzle 5 and over the head 14 of the screw which, as will be seen upon reference to the drawing, is substantially cone-shaped in form so as to produce a passage between it and the inner wall of the enlarged portion of the nozzle 5.

What is claimed is:

In a sausage stuffing machine, the combination of an imperforate barrel having a feed hopper opening into one end thereof and a discharge spout connected to the opposite end thereof, said spout adjacent the barrel having an internal diameter equal to that of the barrel and tapering therefrom toward its discharge end; a shaft extending through the barrel beneath the feed hopper and terminating at the discharge end of the barrel; means for driving said shaft; a feed spiral mounted upon the shaft and rotatable therewith at a point beneath the hopper; a series of alternating collars and worms mounted upon the inner portion of the shaft and rotatable therewith; and a series of cap screws or knives mounted in the body of the barrel, said cap screws or knives extending inwardly in line with the collars and acting to arrest rotative movement of the material as it is compressed and forced longitudinally through the barrel by the worms, said screws also serving in conjunction with the worms to agitate the material and thus free it from entrained air.

In testimony whereof I have signed my name to this specification.

FRANK B. ANDERSON.